Patented Dec. 15, 1931

1,836,695

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE MANUFACTURE OF MULTIPLE ESTERS OF CELLULOSE AND THE PRODUCTS THEREOF

No Drawing.   Application filed August 2, 1929.   Serial No. 383,149.

This application relates to a process for the manufacture of multiple esters of cellulose and particularly to such esters which contain at least three different acid groups attached to the cellulose molecule.

In our copending application, Serial No. 383,147 filed August 2, 1929, we have described processes for the manufacture of mixed esters of cellulose in which both saturated and unsaturated aliphatic and aromatic acids are combined with the cellulose. The general process by which these esters are made is primarily one of substitution or displacement.

The preparation of such mixed esters of cellulose was primarily undertaken to obtain new cellulose products and especially new cellulose products having solubilities which would fit them for purposes to which the known cellulosic esters are unfitted either due to their limited solubility or their physical characteristics. Although many of the mixed esters as described in the above cited application can be so treated, that various solubilities may be obtained, which may be accomplished by considerably extending the time of reaction or hydrolysis of the ester in which the substitution is effected, nevertheless, these mixed esters, in many instances do not have the range of solubility which might be desired.

It is the object of the present invention to provide a process in which organic esters of cellulose may be produced having at least three different acid groups attached to the cellulose molecule, whereby esters may be produced having practically any desired degree of solubility. Other objects will hereinafter appear.

We have found much to our surprise that mixed esters of cellulose may be esterified still further by organic acids merely by dissolving the cellulose mixed ester in a bath containing an organic acid which has a higher activity than one of the acid groups in the cellulose. This process may likewise be conducted by treating the single esters of cellulose in a bath containing two or more organic acids, all of which have an activity greater than the acid group which is combined with the cellulose.

In effecting this reaction we find it desirable to use, as a starting material, either a cellulose ester, such as cellulose acetate, benzoate, propionate, etc., which may or may not be hydrolyzed, or a mixed ester of cellulose such as cellulose acetate lactate, cellulose aceto pyruvate, or cellulose benzol pyruvate which are described in the above cited applications. The selection of the ester will be governed by the nature of the product it is desired to obtain and the solvent to be used. One method of conducting our process comprises dissolving any of the above single cellulose esters in a bath composed of two or more organic acids each of which must have an activity greater than that which corresponds to the activity of the acid combined with the cellulose. As the activity of the reacting acid may be measured by its ionization constant, an acid having a higher ionization constant than that corresponding to the ionization constant of the acid combined with the cellulose will substitute. For example, if the starting material be cellulose acetate either in the partially hydrolyzed or unhydrolyzed form, the acids which may be used to displace the acetic acid in the ester must have an ionization constant greater than $1.82 \times 10^{-5}$ which is the ionization constant for acetic acid. The acids that may be used to substitute for the acetic acid in cellulose acetate would include such acids as tartaric, racemic, malic, glycollic, pyruvic, alpha-keto-butyric, alpha-keto-valeric, alpha-keto-caproic, levulinic, toluic, benzoic and mandelic, as each of these acids have an ionization constant greater than the ionization constant of acetic acid. Moreover, these acids will likewise substitute in other organic esters of cellulose providing, their ionization constant be greater than that of the acid combined with cellulose.

When the substitution is effected in a mixed ester, it is necessary that the substituting organic acids have an ionization content greater than that of one of the acids combined with the cellulose. The substituting acid will then displace only the acid whose ionization constant is less than that of the displacing acid.

In some instances, it will be necessary to dissolve the substituting acid in a suitable solvent prior to the introduction of the cellulosic ester; such an expedient is obviously necessary when the reacting acid is solid at the temperature of the reaction. This solution may be effected in any solvent which is not affected by the esterifying reaction and which acts as a medium for bringing the cellulose ester into intimate contact with the acid. We have found that 1-4 dioxan, ethylene, dichloride and propionic acid are suitable for this purpose in many instances. Water likewise is found advantageous, the utility of its use being enhanced by the fact that it has a tendency to increase the rate of reaction. It must be borne in mind, however, that too great a concentration of the solvent will have a tendency to decrease the rate of reaction.

A suitable temperature for conducting the reaction is about 100° C. and we have found that by placing the materials in a steam jacketed container fitted with an air reflux condenser and heated at or about this temperature, the reaction will proceed smoothly. A higher temperature may be used with a resultant increase in the reaction rate but it must be kept well under the degrading temperature of the cellulose, in the particular acid solution used, which will take place generally at about 150° C. At temperatures much below 100° C., the reaction rate is considerably retarded without any appreciable increase in the quality of the resulting product.

The multiple esters which are obtained by our process have surprisingly different solubilities than would be expected from our knowledge of the mixed esters of cellulose.

This is found to be the case of the multiple esters especially containing both an acetyl and two or more acyl radicals of the alpha hydroxy or alpha or gamma ketonic mono or dibasic acids. In the manufacture of the dual esters of cellulose containing an acetyl group and one of the above acyl groups, a product has never been obtained which is both soluble in acetone and water. However, multiple esters which contain acetyl, lactyl, and pyruvyl were found to be soluble in acetone 50% ethanol-water, methanol and also soluble in water. It is therefore, evident that by our process a new series of esters of cellulose may be prepared having almost any solubility which it is desired to obtain.

We shall now give several examples for carrying out our process but it will be distinctly understood that we shall not be restricted thereby except as is indicated in the appended claims.

*Example 1.*—20 grams of cellulose aceto lactate which is soluble in 75% ethanol-water containing 8% lactyl may be dissolved in 50 c. c. of pyruvic acid (technical grade 84%) and heated by steam in a flask fitted with a reflux condenser until a water-soluble product is obtained which requires about one hour. Upon precipitation in acetone and washing to neutrality with acetone and subsequently drying, a yellowish-white powder results which contains acetyl, pyruvyl, and lactyl groups.

*Example 2.*—20 grams of cellulose aceto lactate soluble in 75% ethanol-water and containing 8% of lactyl may be dissolved in 50 c. c. of pyruvic acid c. p. On heating over a steam bath 100° C. in a suitable container for 5½ hours and after precipitating in a mixture of ether and methanol and washing to neutrality in this precipitant, a white to yellowish powder was obtained on drying which contained all three acyl radicals and had a melting point of 215 to 241° C. and which is soluble in acetone 50% ethanol-water, methanol and also soluble in water.

*Example 3.*—20 grams of acetone-soluble cellulose acetate containing 39.8% acetyl may be dissolved in a mixture of 25 c. c. of pure pyruvic acid, and 25 c. c. of 85% lactic acid. This mixture, on being heated to 100° C. for 17½ hours produced a water-soluble product which may be precipitated from the solution and washed to neutrality in an ether-acetone mixture. This product likewise contained acetyl, lactyl, and pyruvyl groups. Its melting point was 232 to 250° C.

It is evident from the above specification that various equivalents may be employed both for the ester or mixed ester of cellulose which is treated with the replacing acid and also in the replacing acid or acids employed or in the temperature of conducting the reaction without in any way departing from the scope of this invention or sacrificing any of the advantages derived therefrom.

What we claim as new and desire to secure by Letters Patent is:

1. A process for the production of organic esters of cellulose containing more than two dissimilar esterifying groups which comprises treating an organic ester of cellulose in a solution containing a plurality of organic acids having an ionization constant greater than that of the acid group in the ester, said solution containing no organic acid anhydride.

2. A process for the production or organic esters of cellulose containing more than two dissimilar esterifying groups which comprises treating an organic ester of cellulose in a solution containing a plurality of organic acids having an ionization constant greater than the ionization constant of the original groups in the ester and a solvent for the acid, said solution containing no organic acid anhydride.

3. A process for the production of organic esters of cellulose containing more than two dissimilar esterifying groups which comprises treating an organic ester of cellulose in a solution containing a plurality of organic acids having an ionization constant greater than that of the acid group in the ester and 1-4 dioxan.

4. A process for the production of organic esters of cellulose containing more than two dissimilar esterifying groups which comprises treating a mixed ester of cellulose in a solution containing an organic acid having an ionization constant greater than that corresponding to an acid in the cellulose, said solution containing no organic acid anhydride.

5. A process for the production of organic esters of cellulose containing more than two dissimilar esterifying groups which comprises treating a mixed ester of cellulose in a solution containing organic acids having ionization constants greater than that corresponding to an acid group in the cellulose, said solution containing no organic acid anhydride.

6. A process for the production of organic esters of cellulose containing more than two dissimilar esterifying groups which comprises treating a mixed ester of cellulose in a solution containing a plurality of organic acids whose ionization constants are greater than that of an acid group in the cellulose and a solvent for the acids, said solution containing no organic acid anhydride.

7. A process for the production of organic esters of cellulose containing more than two dissimilar esterifying groups which comprises treating a mixed ester of cellulose in a solution containing an organic acid having an ionization constant greater than that of an acid group in the ester and 1-4 dioxan.

8. A process for the production of organic esters of cellulose containing more than two dissimilar esterifying groups which comprises treating cellulose-aceto-lactate in a solution containing an organic acid having an ionization constant greater than $1.82 \times 10^{-5}$.

9. A process for the production of organic esters of cellulose containing more than two dissimilar esterifying groups which comprises treating cellulose-aceto-lactate in a solution containing an organic acid having an ionization constant greater than $1.82 \times 10^{-5}$ and a solvent for the acid.

10. A process for the production of organic esters of cellulose containing more than two dissimilar esterifying groups which comprises treating cellulose-aceto-lactate in a solution containing a plurality of organic acids whose ionization constants are greater than $1.82 \times 10^{-5}$, and 1-4 dioxan, at a temperature of approximately 100° C. until the desired solubility is obtained.

11. A process for the production of organic esters of celulose containing more than two dissimilar esterifying groups which comprises treating celulose-aceto-lactate in a solution containing pyruvic acid, and 1-4 dioxan, at a temperature of approximately 100° C. until a water soluble product is obtained.

12. An organic ester of cellulose containing acetate, pyruvate and lactate radicals.

13. An organic ester of cellulose which is water soluble containing acetate, pyruvate and lactate radicals.

14. A water soluble organic ester of cellulose containing more than two dissimilar esterifying groups.

15. A water soluble organic ester of cellulose containing an acetic acid group and at least two other acid groups each having an ionization constant greater than $1.82 \times 10^{-5}$.

16. An organic ester of cellulose containing acetate, glycollate, and lactate radicals.

17. An organic ester of cellulose containing acetate, tartrate, and pyruvate radicals.

Signed at Rochester, New York this 31st day of July, 1929.

CHARLES S. WEBBER.
CYRIL J. STAUD.